US012680933B2

(12) United States Patent
Lu et al.

(10) Patent No.: US 12,680,933 B2
(45) Date of Patent: Jul. 14, 2026

(54) DEVICE AND METHOD FOR MEASURING GAS CONCENTRATION

(71) Applicant: UNIVERSITY OF SCIENCE AND TECHNOLOGY OF CHINA, Hefei (CN)

(72) Inventors: Song Lu, Hefei (CN); Yu Guan, Hefei (CN); Heping Zhang, Hefei (CN)

(73) Assignee: University Of Science And Technology Of China, Hefei (CN)

( * ) Notice: Subject to any disclaimer, the term of this patent is extended or adjusted under 35 U.S.C. 154(b) by 681 days.

(21) Appl. No.: 18/044,306

(22) PCT Filed: Sep. 9, 2020

(86) PCT No.: PCT/CN2020/114269
§ 371 (c)(1),
(2) Date: Mar. 7, 2023

(87) PCT Pub. No.: WO2022/051947
PCT Pub. Date: Mar. 17, 2022

(65) Prior Publication Data
US 2023/0324271 A1 Oct. 12, 2023

(51) Int. Cl.
*G01N 15/06* (2024.01)
*G01F 1/48* (2006.01)
(Continued)

(52) U.S. Cl.
CPC .............. *G01N 11/08* (2013.01); *G01F 1/48* (2013.01); *G01N 7/00* (2013.01)

(58) Field of Classification Search
CPC ............................................. G01N 15/06–075
See application file for complete search history.

(56) References Cited

U.S. PATENT DOCUMENTS 4,578,990 A * 4/1986 Abbott ................... G01N 11/08
73/64.54
4,627,271 A * 12/1986 Abbott ................... G01N 11/08
73/54.06
(Continued)

FOREIGN PATENT DOCUMENTS

CN 103163046 A 6/2013
CN 103398747 A 11/2013
(Continued)

OTHER PUBLICATIONS

"International Application Serial No. PCT/CN2020/114269, International Search Report dated Jun. 8, 2021", w/ English Translation, (Jun. 8, 2021), 7 pgs.
(Continued)

*Primary Examiner* — Alexander A Mercado
(74) *Attorney, Agent, or Firm* — Schwegman Lundberg & Woessner, P.A.

(57) ABSTRACT

Provided is a device for measuring a gas concentration, including: a preheating module configured to preheat and rectify an input to-be-measured gas to output a first stage gas; a differential pressure conversion module connected to the preheating module, wherein the differential pressure conversion module is configured to allow the first stage gas flowing through to generate a differential pressure change value; and a processing module configured to acquire a volume concentration of the to-be-measured gas according to the differential pressure change value; wherein the differential pressure conversion module comprises a capillary laminar flow unit having a plurality of capillaries, and flow channels of the plurality of capillaries become a main channel of a gas flow, so as to form a laminar flow structure. A method for measuring a gas concentration is further provided, including measuring a concentration of a to-be-
(Continued)

measured gas using the above-mentioned device for mea-
suring a gas concentration.

10 Claims, 7 Drawing Sheets

(51) Int. Cl.
  *G01N 7/00* (2006.01)
  *G01N 11/08* (2006.01)

(56) References Cited

U.S. PATENT DOCUMENTS

| | | | |
|---|---|---|---|
| 5,837,903 A | 11/1998 | Weigand | |
| 6,112,576 A * | 9/2000 | Tsopelas | G01N 27/74 |
| | | | 73/25.02 |
| 2020/0110016 A1 | 4/2020 | Bian et al. | |

FOREIGN PATENT DOCUMENTS

| | | | |
|---|---|---|---|
| CN | 104198332 A | 12/2014 | |
| CN | 204330535 U | 5/2015 | |
| CN | 105424546 A | 3/2016 | |
| CN | 105953848 A | 9/2016 | |
| CN | 109540747 A | 3/2019 | |
| CN | 110844118 A | 2/2020 | |
| CN | 111307228 A | 6/2020 | |

OTHER PUBLICATIONS

Ferrarese, J. A., "General Guidelines for Measuring Fire-
Extinguishing Agent Concentrations in PowerpNwu Compart-
ments", Federal Aviation Administration1977, (Sep. 21, 1977), 20
pgs.

* cited by examiner

| A test point in a test space is connected to a device for measuring a gas concentration by using a gas pipeline | Step 101 |

↓

| Whether a status of a gas flowing through the device for measuring a gas concentration is normal is checked | Step 102 |

↓

| The device for measuring the gas concentration is preheated to a set temperature, and an output signal of the measuring device is checked | Step 103 |

↓

| The device for measuring a gas concentration is calibrated by using a target gas with a known concentration | Step 104 |

↓

| A test is carried out and data is recorded | Step 105 |

↓

| After the test is completed, the device for measuring the gas concentration is cooled and a residual gas in the measuring device is purged | Step 106 |

FIG. 13

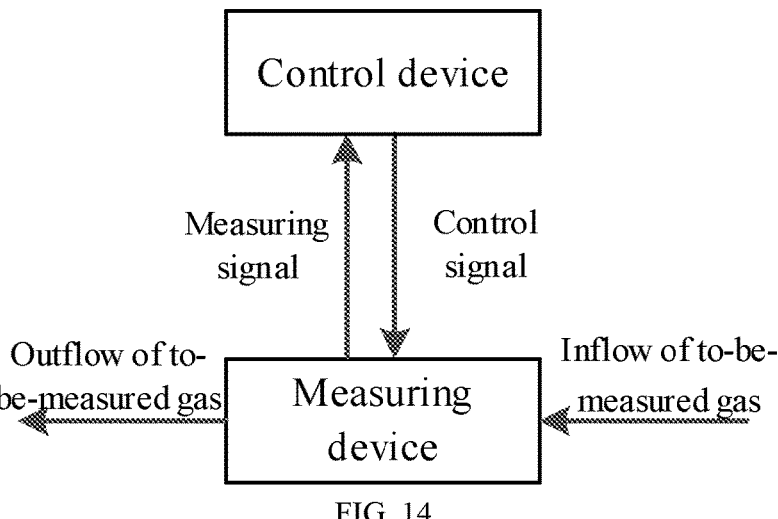

FIG. 14

DEVICE AND METHOD FOR MEASURING GAS CONCENTRATION

PRIORITY APPLICATIONS

This application is a U.S. National Stage Filing under 35 U.S.C. § 371 from International Application No. PCT/CN2020/114269, filed on Sep. 9, 2020, and published as WO2022/051947 on Mar. 17, 2022; the benefit of priority of which is hereby claimed herein, and which application and publication are hereby incorporated herein by reference in their entirety.

TECHNICAL FIELD

The present disclosure relates to a field of instrument and equipment technology, and in particular, to a device and a method for measuring a gas concentration.

BACKGROUND

With a development of science and technology, it is sometimes required to measure a concentration state of a certain gas in a space in real time. For example, it is required to determine whether an amount of a gas extinguishing agent carried by an extinguishing system in a vehicle or aircraft is qualified, it is required to release the extinguishing agent to a to-be-protected space and record a volume concentration of the extinguishing agent at representative locations in each region of the to-be-protected space through a measuring system. A concentration value of the extinguishing agent must be higher than a known effective extinguishing concentration, and the effective extinguishing concentration refers to a concentration of the extinguishing agent sufficient to extinguish a fire that may occur in a protected region within a certain time.

Patent CN109540747A discloses an airborne measuring device for an extinguishing agent concentration in an aircraft power device cabin. However, the patent does not provide an implementation for a laminar flow differential pressure measuring device in a single channel measurement unit, which is difficult for those skilled in the art to be implemented. Patent CN103163046A discloses a device for measuring a concentration of a gas extinguishing agent. However, the patent uses an integral heating method for a constant temperature and constant current micro differential pressure generator, which is vulnerable to an environmental factor; the patent controls flows of four channels together by using a flow controller, which may cause the flow between the four channels to be unbalanced due to factors such as a blockage, a processing technology, etc., and lead to a measurement error. Patent CN110844118A discloses a testing device and method of testing a differential pressure in a porous structure. However, the patent uses a solution of immersing a perforated screen in oil, and the oil may cause a pollution in use, which may cause a difficulty in maintenance. Patent CN105424546 discloses a concentration measuring device for an extinguishing agent concentration measuring system. However, a through-hole solution adopted in the patent may bring an inconvenience to equipment processing; a solution of a pressure stabilizing cavity may cause a gas mixing and may be not conducive to improving a response time; a temperature sensor detects temperatures of a heating block and a pressure measuring block, instead of a temperature of gas. When an environment changes, a measurement accuracy may be affected.

Therefore, how to acquire a more accurate gas concentration measured result is an urgent technical problem to be solved.

SUMMARY

An aspect of the present disclosure provides a device for measuring a gas concentration, including:

a preheating module configured to preheat and perform flow conditioning on an input to-be-measured gas to output a first stage gas;

a differential pressure conversion module connected to the preheating module, wherein the differential pressure conversion module is configured to allow the first stage gas flowing through the differential pressure conversion module to generate a differential pressure change value; and a processing module configured to acquire a volume concentration of the to-be-measured gas according to the differential pressure change value;

wherein the differential pressure conversion module comprises a capillary laminar flow unit having a plurality of capillaries, and flow channels of the plurality of capillaries become a main channel of a gas flow, so as to form a laminar flow structure.

Optionally, the preheating module includes:

a gas flow channel configured to perform flow conditioning on the to-be-measured gas;

a preheating module electric heating unit configured to heat the gas flow channel to conduct and heat the to-be-measured gas; and a preheating module temperature control unit configured to measure and regulate a temperature of the to-be-measured gas, and wherein the gas flow channel has no bending and is provided with a plurality of capillary pipelines.

Optionally, the preheating module temperature control unit includes a preheating module thermocouple arranged perpendicular to a gas flow direction.

Optionally, the differential pressure conversion module further includes:

a differential pressure conversion module housing coated outside the capillary laminar flow unit, wherein an upstream differential pressure measuring hole is arranged at the differential pressure conversion module housing corresponding to an upstream end of the capillary laminar flow unit, and a downstream differential pressure measuring hole is arranged at the differential pressure conversion module housing corresponding to a downstream end of the capillary laminar flow unit;

a differential pressure sensor having two ends respectively connected to the upstream differential pressure measuring hole and the downstream differential pressure measuring hole, wherein the differential pressure sensor is configured to measure a differential pressure between the differential pressure measuring holes; and a flow limiting element located at a downstream outlet of the differential pressure conversion module housing, wherein the flow limiting element is configured to maintain a constant volume flow flowing through the device for measuring a gas concentration.

Optionally, the differential pressure conversion module further includes:

a differential pressure conversion module electric heating unit configured to heat the differential pressure conversion module; and

a differential pressure conversion module temperature control unit configured to measure and regulate a temperature of the to-be-measured gas flowing through the capillary laminar flow unit and the flow limiting element, wherein the differential pressure conversion module temperature control unit comprises a differential pressure conversion module thermocouple arranged perpendicular to a gas flow direction.

Optionally, the differential pressure conversion module further includes:

an upstream capillary rectifying element located between an upstream inlet of the differential pressure conversion module housing and the upstream differential pressure measuring hole;

a downstream capillary rectifying element located between the downstream outlet of the differential pressure conversion module housing and the downstream differential pressure measuring hole; and an absolute pressure gauge arranged at the upstream differential pressure measuring hole, wherein the absolute pressure gauge is configured to monitor an absolute pressure value in a gas flow channel, so as to improve a measurement accuracy.

Optionally, the capillary laminar flow unit further comprises:

a sleeve including a first sleeve and a second sleeve, wherein the first sleeve and the second sleeve are sleeved outside the plurality of capillaries from two sides, respectively; and an adhesive coated on an outer wall of the capillary and an inner wall of the sleeve, wherein the adhesive is configured to fix the plurality of capillaries, so that the plurality of capillaries are not moved under an action of a gas flow of the to-be-measured gas.

Optionally, a pipe diameter $d_{LFE}$ of the capillary is expressed as:

$$d_{LFE} = \frac{4\rho Q_V}{\pi\mu n Re}$$

where $\mu$ is a dynamic viscosity of the to-be-measured gas, n is the number of capillaries, $\rho$ is a density of the to-be-measured gas, Re is a Reynolds number, and $Q_V$ is the flow.

Another aspect of the present disclosure provides a method for measuring a gas concentration, using the above-mentioned device for measuring a gas concentration to measure a concentration of a to-be-measured gas, the method for measuring a gas concentration includes:

operation S1: performing a preheating treatment on the device for measuring a gas concentration;

operation S2: inputting the to-be-measured gas in a space into the preheated device for measuring a gas concentration, and recording a differential pressure value; and operation S3: determining the concentration of the to-be-measured gas according to the differential pressure value and an empirical relationship between a volume concentration of the to-be-measured gas and the differential pressure value.

Optionally, the operation S1 includes:

operation S11: injecting a to-be-measured gas with a concentration of 0 or a known concentration into the device for measuring a gas concentration; and operation S12: performing a heating through a preheating module electric heating unit and a differential pressure conversion module electric heating unit, so that temperature values measured by a preheating module thermocouple and a differential pressure conversion module thermocouple are stable and the same, so as to complete the preheating treatment.

BRIEF DESCRIPTION OF THE DRAWINGS

The accompanying drawings are intended to provide a further understanding of the present disclosure and form a portion of the specification. The accompanying drawings are used to explain the present disclosure together with following specific embodiments, but do not constitute a limitation to the present disclosure, in which:

FIG. 13 shows a workflow schematic diagram of a system of measuring a gas concentration according to an embodiment of the present disclosure;

FIG. 14 shows a composition schematic diagram of a system of measuring a gas concentration according to an embodiment of the present disclosure.

Figure 1:
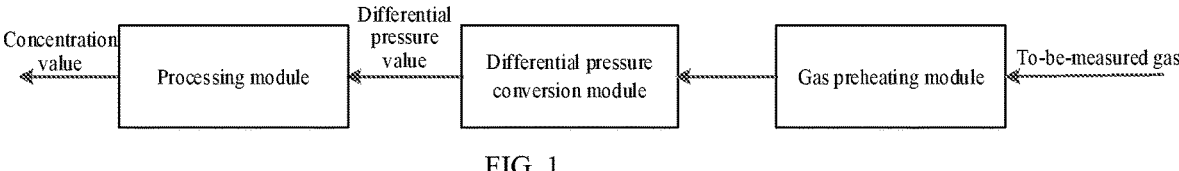
FIG. 1 shows a composition schematic diagram of a device for measuring a gas concentration according to an embodiment of the present disclosure.

DESCRIPTION OF SYMBOLS 1 housing base; 2 housing upper cover; 3 gas inlet and outlet panel; 4, 61 gas inlet straight joint; 5, 64 gas preheating module gas pipeline; 6, 62 gas preheating module heating clamp block; 7 gas preheating module electric heating unit; 8 gas preheating module straight joint; 9 gas preheating module gas low heat conduction hose; 10, 65 gas preheating module temperature measurement tee joint; 11 gas preheating module thermocouple; 12, 69 differential pressure conversion module housing; 12-1 gas flow inlet; 12-2 gas flow outlet; 12-3 upstream differential pressure measuring hole; 12-4 downstream differential pressure measuring hole; 13, 68 capillary laminar flow unit; 13-1 capillary; 13-2 first sleeve; 13-3 second sleeve; 14 differential pressure conversion module electric heating unit; 15 flow limiting element; 16 differential pressure measuring hole joint; 17 upstream differential pressure measuring hose; 18 downstream differential pressure measuring hose; 19 differential pressure sensor 90 degree elbow; 20 differential pressure sensor installing clip; 21 differential pressure conversion module low heat conduction hose; 22 differential pressure conversion module temperature measurement tee; 23 differential pressure conversion module thermocouple; 24 differential pressure conversion module gas pipeline; 25 flowmeter joint; 26 flowmeter; 27 flowmeter installing clip; 28 front panel; 29 flowmeter-to-gas outlet connecting hose; 30 gas outlet panel installing straight joint; 31 three-hole current signal aviation plug; 32 two-hole power supply aviation plug; 33 electrical rear panel; 34 solid-state relay; 35 power supply terminal; 36 rocker switch; 37 preheating module temperature controller; 38 differential pressure conversion module temperature controller; 39 differential pressure sensor; 40 device for measuring gas concentration; 41 fixing plug-in box of device for measuring a gas concentration; 42 cooling and ventilating equipment plug-in box; 43 keyboard/mouse tray; 44 control device plug-in box; 45 display; 46 power supply plug-in box; 47 cabinet; 48 cabinet reserved space; 49 cabinet wheel; 50 rear access door; 51 interface panel; 52 side access door; 51-1 power output installing hole; 51-2 power input connector installing hole; 51-3 cabinet gas inlet bulkhead joint; 51-4 cabinet gas outlet bulkhead joint; 63 electric heating silicone pad installing groove; 66 upstream capillary rectifying element; 67 upstream differential pressure measuring hole joint; 70 downstream differential pressure measuring hole joint; 71 downstream capillary rectifying element; 72 micropore plate flow limiting element; 73 differential pressure conversion module temperature measurement tee thermocouple installing hole; 74 differential pressure conversion module temperature measurement tee; 75 differential pressure conversion module temperature measurement tee gas flow outlet; 76 upstream capillary rectifying element fixed hole; 77 capillary laminar flow unit fixed hole; 78 downstream capillary rectifying element fixed hole; 79 gas inlet thermal baffle; 80 upper thermal baffle; 81, 86 side thermal baffle; 82 thermocouple reserved hole on upper thermal baffle of gas preheating module; 83 thermocouple reserved hole on upper thermal baffle of differential pressure conversion module; 84 fixing bolt; 85 bolt hole.

DETAILED DESCRIPTION OF EMBODIMENTS

The present disclosure provides a device and method for measuring a gas concentration, which have a high measurement accuracy, may be calibrated, have a good repeatability, may adapt to a change in a test environmental factor, may be used to analyze whether the gas concentration meets a demand, and have a broad application prospect.

The technical solution of the present disclosure will be clearly and completely described below in combination with embodiments and the accompanying drawings in the embodiments. Obviously, described embodiments are only part, not all of embodiments of the present disclosure. Based on embodiments of the present disclosure, all other embodiments obtained by those skilled in the art without any inventive effort fall within the scope of protection of the present disclosure.

In embodiments of the present disclosure, a device for measuring a gas concentration is provided. In combination with FIG. 1 to FIG. 8, the device for measuring a gas concentration includes:

a preheating module configured to preheat and perform flow conditioning on an input to-be-measured gas to output a first stage gas;

a differential pressure conversion module connected to the preheating module, wherein the differential pressure conversion module is configured to allow the first stage gas flowing therethrough to generate a differential pressure change value, and wherein the differential pressure conversion module includes a capillary laminar flow unit having a plurality of capillaries; and a processing module configured to acquire a volume concentration of the to-be-measured gas according to the differential pressure change value.

According to embodiments of the present disclosure, the device for measuring a gas concentration includes: a housing, a gas inlet, a gas preheating module, a differential pressure conversion module, a gas outlet, a differential pressure sensor, a temperature control element and an electrical interface. The gas inlet and the gas outlet are installed on the housing, and the gas inlet, the gas preheating module, the differential pressure conversion module and the gas outlet are connected sequentially through a gas pipeline element. The differential pressure sensor is installed on the differential pressure conversion module and fixed on the housing. The temperature control element is installed inside the housing. The electrical interface is connected to the differential pressure sensor and the temperature control element and fixed on the housing. The housing is used to fix components of a sensor and protect internal components from a mechanical and vibration damage and shield an electromagnetic interference; the gas inlet is used to connect a gas pipeline and provide an interface for a gas to flow out of the sensor; the gas outlet is used to connect the gas pipeline and provide an interface for the gas to flow out of the sensor; the gas preheating module is used to preheat and perform flow conditioning on an incoming measured gas; the differential pressure conversion module is used to convert a concentration of a measured gas into a differential pressure change; the differential pressure sensor is used to measure a differential pressure change value of the differential pressure conversion module; the temperature control element is used to control an operation of a heater according to a set value and a result of a gas flow temperature measurement, so as to control a gas flow temperature; the electrical interface is used to supply power to the device for measuring a gas concentration and output a measured result of the device. The measured gas flows in from a test space through the gas pipeline, and the measured gas flows out of the device after being sensed by the device for measuring a gas concentration.

According to embodiments of the present disclosure, the gas preheating module is composed of a gas preheating module gas inlet end, a gas preheating module gas outlet end, a gas flow channel, a heating element, and a temperature control unit. The gas preheating module gas inlet end is connected to a gas inlet, the gas preheating module gas outlet end is connected to the differential pressure conversion module, the gas preheating module gas inlet end is connected to the gas preheating module gas outlet end through the gas flow channel, and the temperature control unit and the heating element are installed on the gas flow channel. The gas preheating module gas inlet end is used to introduce a gas into the gas preheating module and realize a mechanical connection with the gas inlet; the gas preheating module gas outlet end is used to be connected to the differential pressure conversion module and deliver a pre-heated gas to the differential pressure conversion module; the gas flow channel is used to perform flow conditioning on the gas, and transfer a heat generated by the heating element into the gas to heat a gas flow; the heating element is used to heat the gas flow channel; and the temperature control unit is used to measure a gas flow problem after the gas flow channel is heated.

According to embodiments of the present disclosure, the gas flow channel has no bending, a heat exchange structure with heat exchange and performing flow conditioning functions is installed in the channel, and a heating component is installed outside the channel.

According to embodiments of the present disclosure, the temperature control unit is installed downstream of a gas flowing in the gas flow channel, and is located adjacent to the gas preheating module gas outlet end.

According to embodiments of the present disclosure, the differential pressure conversion module is composed of a capillary laminar flow unit, a flow limiting element, a differential pressure measuring hole, a gas flow temperature measuring section, a heating element, a flow indicator, and a differential pressure conversion module housing. A gas concentration difference conversion section housing is provided with a circular flow channel for a gas to flow. The circular flow channel is provided with a gas inlet and a gas outlet. The gas concentration difference conversion section housing is provided with two differential pressure measuring holes in a direction perpendicular to an axis of the circular flow channel. A spacing between projection points of axes of the differential pressure measuring holes on the axis of the circular flow channel is greater than a length of the capillary laminar flow unit, an axis of the capillary laminar flow unit coincides with the axis of the circular flow channel in the gas concentration difference conversion section housing, and the capillary laminar flow unit is installed between two differential pressure measuring holes. The heating element is installed outside the gas concentration difference conversion section housing, which may be used to keep a temperature of the gas flowing through the capillary laminar flow unit and the flow limiting element substantially constant. The flow limiting element is installed at an outlet of the circular flow channel in the gas concentration difference conversion section housing, an inlet of the flow limiting element is adjacent to a side of the capillary laminar flow unit, an outlet of the flow limiting element is connected to an inlet of the gas flow temperature measuring section, an inlet of the flow indicator is connected to an outlet of the gas flow temperature measuring section, and the outlet of the flow indicator is connected to a gas outlet of a gas concentration sensor. The capillary laminar flow unit is used to form differential pressures at both ends of the capillary laminar flow unit when the gas flows therethrough; the flow limiting element is used to maintain a constant volume flow flowing through the device for measuring a gas concentration; the differential pressure measuring hole is used to measure differential pressure values before and after the capillary laminar flow unit; the gas flow temperature measuring section is used to measure a temperature of the gas flowing through the flow limiting element; the heating element is used to keep a temperature of the gas flowing through the capillary laminar flow unit and the flow limiting element substantially constant; the flow indicator is used to display a state of the gas flowing through the differential pressure conversion module; the differential pressure conversion module housing is used to install the capillary laminar flow unit, the flow limiting element and the heating element, and is used to provide the differential pressure measuring hole.

According to embodiments of the present disclosure, a pressure measuring pipeline connected to two differential pressure measuring holes on the differential pressure conversion module should have an equal length, and the pressure measuring pipeline is made of a material with a poor heat conduction.

According to embodiments of the present disclosure, axes of the gas preheating module gas flow channel, the capillary laminar flow unit in the differential pressure conversion module, the flow limiting element, and the gas flow channel in the gas temperature measuring section are preferably located on the same straight line, and a cross section through which the gas flows in the flow channel is circular.

According to embodiments of the present disclosure, an outer wall of the capillary laminar flow unit is fitted with an inner wall of the circular flow channel in the gas concentration difference conversion section housing during assembly.

According to embodiments of the present disclosure, the capillary laminar flow unit is composed of a circular tubular outer wall and a circular capillary, a plurality of circular capillaries are arranged in a cylindrical outer wall, and the circular tubular outer wall is used to fix the circular capillary. A flow channel of the plurality of capillaries becomes a main channel of the gas flow, so as to form a laminar flow structure. A gap between the capillaries and a gap between the capillary and a sleeve is blocked by an adhesive, so that the gas flow rarely flows therethrough. An effective flow area of the gas pipeline before the gas enters the differential pressure conversion module is the same or approximately the same as an effective flow area of the capillary laminar flow unit.

According to embodiments of the present disclosure, the flow limiting element is used to maintain a constant gas volume flow by using a micro precision orifice structure.

According to embodiments of the present disclosure, the device for measuring a gas concentration is designed so that a ratio of absolute pressures at the gas outlet and at the gas inlet is not higher than 0.528.

Figure 2:
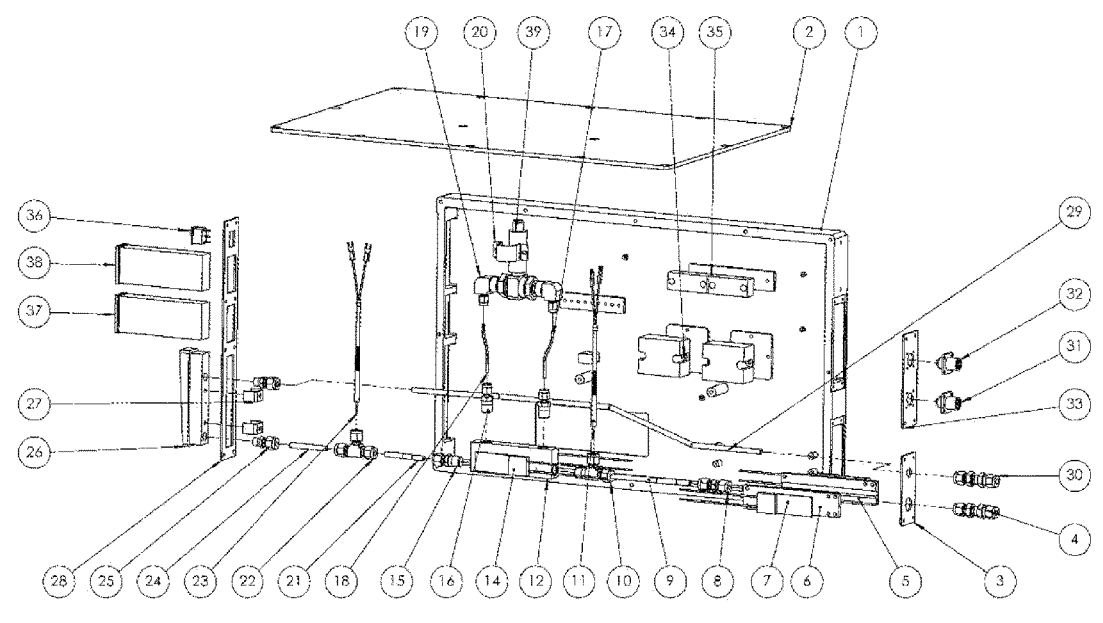
FIG. 2 shows an exploded view of a device for measuring a gas concentration according to an embodiment of the present disclosure.

As shown in FIG. 2, the device for measuring a gas concentration is composed of a housing base 1, a housing upper cover 2, a gas inlet and outlet panel 3, a gas inlet straight joint 4, a gas preheating module gas pipeline 5, a gas preheating module heating clamp block 6, a gas preheating module electric heating unit 7, a gas preheating module straight joint 8, a gas preheating module gas low heat conduction hose 9, a gas preheating module temperature measurement tee joint 10, and a gas preheating module thermocouple 11, a differential pressure conversion module housing 12, a differential pressure conversion module electric heating unit 14, a flow limiting element 15, a differential pressure measuring hole joint 16, an upstream differential pressure measurement hose 17, a downstream differential pressure measurement hose 18, a differential pressure sensor 90 degree elbow 19, a differential pressure sensor installing clip 20, a low heat conduction hose 21, a differential pressure conversion module temperature measurement tee 22, a differential pressure conversion module thermocouple 23, a differential pressure conversion module gas pipeline 24, a flowmeter joint 25, a flowmeter 26, a flowmeter installing clip 27, a front panel 28, a flowmeter-to-gas outlet connecting hose 29, a gas outlet panel installing straight joint 30, a three-hole current signal aviation plug 31, a two-hole power supply aviation plug 32, an electrical rear panel 33, a solid-state relay 34, a power supply terminal 35, a rocker switch 36, a preheating module temperature controller 37, a differential pressure conversion module temperature controller 38 and a differential pressure sensor 39.

Figure 3:
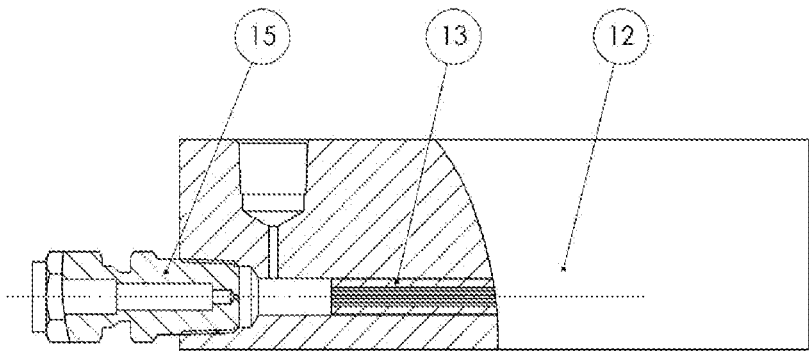
FIG. 3 shows a partial sectional structural schematic diagram of a differential pressure conversion module according to an embodiment of the present disclosure.
Figure 4:
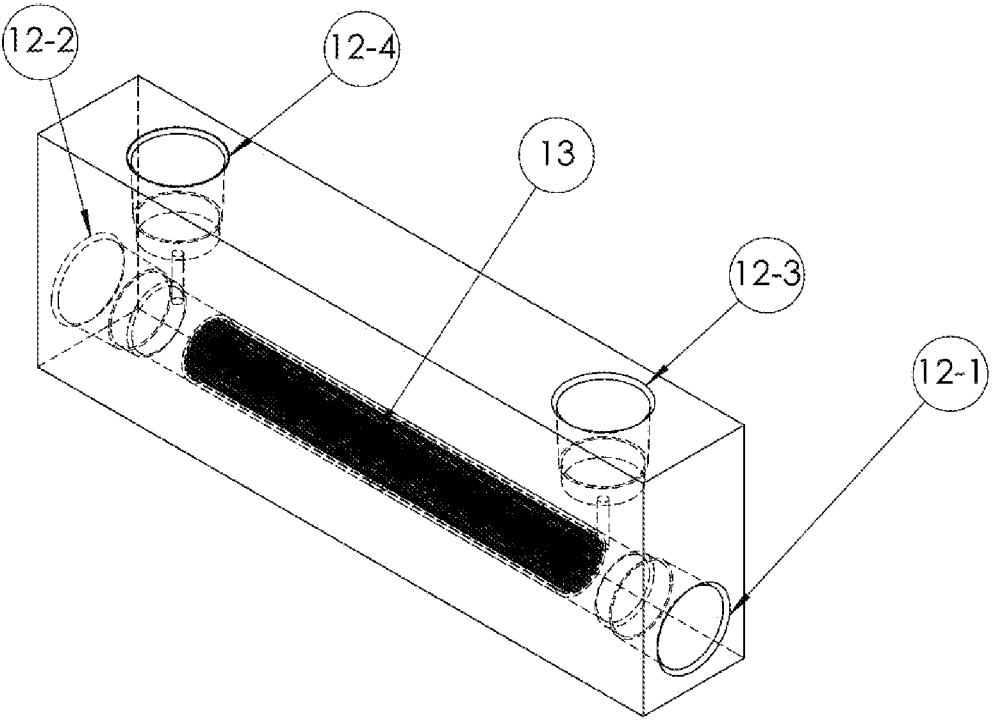
FIG. 4 shows a perspective structural schematic diagram of a differential pressure conversion module according to an embodiment of the present disclosure.

As shown in FIG. 3 and FIG. 4, the capillary laminar flow unit 13 is installed inside the differential pressure conversion module housing 12, and a position relationship of the differential pressure conversion module housing 12, the capillary laminar flow unit 13 and the flow limiting element 15 is provided.

The housing base 1 and the housing upper cover 2 form a housing of the device for measuring a gas concentration, which is used to install and fix components of the device for measuring a gas concentration and protect the components from an impact damage. The housing base 1 and the housing upper cover 2 are made of aluminum, which has a low cost and a good electromagnetic interference resistance. The housing base 1 and the housing upper cover 2 may also be made of other lighter materials. The housing upper cover 2 is fixed on the housing base 1 through a screw.

The gas inlet and outlet panel 3 is fixed on the housing base 1 through the screw. The gas inlet and outlet panel is made of a stainless steel. The gas inlet straight joint 4 and the gas outlet panel installing straight joint 30 are installed and compressed on the gas inlet and outlet panel 3 through a nut.

The gas inlet straight joint 4 is connected to the gas preheating module gas pipeline 5 by using a stainless steel ferrule. In order to improve a rectification and preheating effect of the gas preheating module gas pipeline 5 on the gas flowing therethrough, a certain number of stainless steel capillary pipelines are fixed in the gas preheating module gas pipeline 5. A too thin diameter of the capillary pipeline may cause a too high flow resistance. A selection of a diameter and a length of the capillary pipeline should be designed with a comprehensive consideration of a gas flow and a preheating effect. A gas outlet end of the gas preheating module gas pipeline 5 is connected to the gas preheating module straight joint 8 through a ferrule.

Two gas preheating module heating clamp blocks 6 clamp the gas preheating module gas pipeline 5 through a semi-circular groove in the middle of an inner side of the gas preheating module heating clamp blocks 6, and clamp the gas preheating module gas pipeline 5 tightly through a bolt. A gap between the gas preheating module heating clamp block 6 and the gas preheating module gas pipeline 5 is filled with a thermally conductive silicone grease. In order to prevent components from shaking, the gas preheating module heating clamp block 6 is fixed on the housing base 1 through the screw.

The gas preheating module electric heating unit 7 is installed outside the two gas preheating module heating clamp blocks 6. A preferred installation method is to stick the gas preheating module electric heating unit 7 to an outer side of the gas preheating module heating clamp block 6 through a heat-resistant adhesive. The gas preheating module electric heating unit 7 is coated with an insulating material to prevent a heat from spreading outward. The gas preheating module electric heating unit 7 is preferably a product below 24V, so as to improve a safety of the device for measuring a gas concentration.

The gas preheating module straight joint 8 is connected to the gas preheating module temperature measurement tee joint 10 through the low heat conduction hose 21, and a connection mode therebetween is a ferrule. The low heat conduction hose 21 is not only used to provide a path for a gas to flow, but also used to reduce a heat transfer from the gas preheating module gas pipeline 5 and the gas preheating module heating clamp block 6 to the gas preheating module temperature measurement tee joint 10, and to reduce an installation inconvenience caused by a processing tolerance through a hose connection.

An end of the gas preheating module temperature measurement tee joint 10 perpendicular to a gas flow direction is used to install the gas preheating module thermocouple 11. The gas preheating module thermocouple 11 is used to measure a temperature of a gas flow flowing at the gas preheating module temperature measurement tee joint. The gas preheating module thermocouple 11, the preheating module temperature controller 37, the gas preheating module electric heating unit 7, the solid-state relay 34, the power supply terminal 35 and lines connected therebetween form a temperature control loop, which controls and regulates the temperature of the gas flow flowing at the gas preheating module temperature measurement tee joint.

In order to reduce a volume, the gas preheating module temperature measurement tee joint 10 is connected to a gas flow inlet 12-1 of the differential pressure conversion module housing 12 through a thread, as shown in FIG. 4. The capillary laminar flow unit 13 is installed in a flow channel of the differential pressure conversion module housing 12. A gas flow outlet 12-2 of the differential pressure conversion module housing 12 is connected to the flow limiting element 15 through the thread, as shown in FIG. 3. The differential pressure conversion module electric heating unit 14 is installed on an outer wall of the differential pressure conversion module housing. An upstream differential pressure measuring hole 12-3 and a downstream differential pressure measuring hole 12-4 of the differential pressure conversion module housing 12 are connected to two differential pressure measuring hole joints 16 through the thread.

The two differential pressure measuring hole joints 16 are connected to the upstream differential pressure measuring hose 17 and the downstream differential pressure measuring hose 18 respectively through the ferrule. The above-mentioned two pressure measuring hoses 17 and 18 are connected two differential pressure measuring holes of the differential pressure sensor 39 through the differential pressure sensor 90 degree elbow 19. The upstream differential pressure measuring hose 17 and the downstream differential pressure measuring hose 18 have the same length, and are preferably hoses with a poor heat conductivity. The differential pressure sensor 39 is fixed on the housing base 1 by the differential pressure sensor installing clip 20.

The flow limiting element 15 is connected to the differential pressure conversion module temperature measuring tee 22 through the low heat conduction hose 21, and both ends of the low heat conduction hose 21 are connected by the ferrule. The hose 21 is not only used to provide the path for the gas to flow, but also used to reduce a heat transfer from the differential pressure conversion module housing 12 to the differential pressure conversion module temperature measurement tee 22, and reduce the installation inconvenience caused by the processing tolerance through the hose connection.

An end of the differential pressure conversion module temperature measurement tee 22 perpendicular to the gas flow direction is used to install the differential pressure conversion module thermocouple 23. The differential pressure conversion module thermocouple 23 is used to measure a temperature of a gas flow flowing through the differential pressure conversion module temperature measurement tee

22. The differential pressure conversion module thermocouple 23, the differential pressure conversion module temperature controller 38, the differential pressure conversion module electric heating unit 14, the solid-state relay 34, the power supply terminal 35 and lines connected therebetween form a temperature control loop to control and regulate the temperature of the gas flow flowing at the differential pressure conversion module temperature measurement tee 22.

A gas flow outlet end of the differential pressure conversion module temperature measurement tee 22 is connected to the differential pressure conversion module gas pipeline 24, and the pipeline 24 is connected to a gas inlet end of the flowmeter 26 through a flowmeter joint 25. The flowmeter 26 is fixed on the front panel 28 through the flowmeter installing clip 27. The front panel 28 is fixed on the housing base 1 by the screw. A gas outlet end of the flowmeter 26 is connected to the flowmeter-to-gas outlet connecting hose 29 through another flowmeter joint 25. The other end of hose 29 is connected to the gas outlet panel installing straight joint 30. So far, through a plurality of elements, the gas inlet straight joint 4 and the gas outlet panel installing straight joint 30 form a path for a gas to flow. When the gas flows through the path, a gas volume concentration may be converted into a differential pressure signal.

The rocker switch 36, the preheating module temperature controller 37 and the differential pressure conversion module temperature controller 38 are all fixed on the front panel 28. The flowmeter 26, the rocker switch 36, the preheating module temperature controller 37 and the differential pressure conversion module temperature controller 38 are all installed on a panel on one side, so as to facilitate a user operation.

The three-hole current signal aviation plug 31 and the two-hole power supply aviation plug 32 are installed on the electrical rear panel 33 through the screw, and the electrical rear panel 33 is installed on the housing base 1 through the screw. The three-hole current signal aviation plug is used to transmit a current signal generated by a differential pressure sensor. The two-hole power supply aviation plug 32 is used for power supply and is connected to the power supply terminal 35 and the rocker switch 36. The rocker switch 36 may control a switch of an electrical portion of the whole device for measuring a gas concentration.

Figure 5:
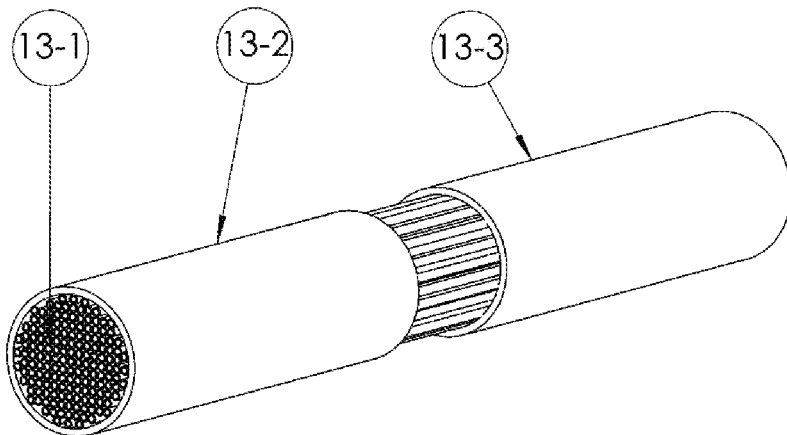
FIG. 5 shows an assembly schematic diagram of a capillary laminar flow unit according to an embodiment of the present disclosure.
Figure 6:
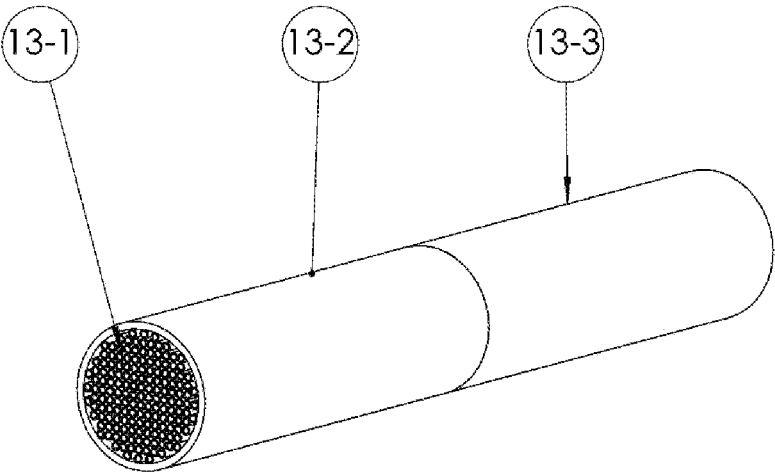
FIG. 6 shows a structural schematic diagram of a capillary laminar flow unit according to an embodiment of the present disclosure.

In such embodiments, as shown in FIG. 5 and FIG. 6, a capillary 13-1 is fixed by sleeves (including a first sleeve 13-2 and a second sleeve 13-3), so that any capillary may not move under an action of a possible gas flow. A length of the capillary 13-1 is equal to a sum of lengths of the sleeve 13-2 and the sleeve 13-3.

According to embodiments of the present disclosure, a dynamic viscosity of the to-be-measured gas is $\mu$, a density of the to-be-measured gas is $\rho$, a number of the capillaries is n, a Reynolds number is Re, and $Q_V$ is a flow; an inner diameter $d_{LFE}$ of a single capillary is expressed by:

$$d_{LFE} = \frac{4\rho Q_V}{\pi \mu n Re}.$$

Due to a process limitation, a range of $d_{LFE}$ selected in a project is preferably in a range of 0.2 mm to 1 mm; in order to reduce a fluctuation degree of a measured value, a value of Re is less than 800; the number n of the capillaries and the inner diameter $d_{LFE}$ of the capillaries are determined through the above-mentioned formula and parameters, that is, a cross-section structure of the capillary laminar flow unit may be determined. A differential pressure value conversion coefficient $K_0$ per unit length under the flow $Q_V$ may be measured through an experiment, a length of the capillary laminar flow unit is L, so that a differential pressure generated by the capillary laminar flow unit is $\Delta P = K_0 L$. A value of $\Delta P$ may be determined according to an effective range of a sensor selected for measuring a differential pressure, so that the length of the capillary laminar flow unit may be determined according to $L = \Delta P / K_0$.

The number of the capillaries is 139, and the capillary has an inner diameter of 0.4 mm, a wall thickness of 0.1 mm, and a length of 70 mm. A flow area of all the capillaries is about 17.5 mm², and a flow area of a front-end gas inlet pipeline is about 16.4 mm², and both of the areas are similar to each other.

If the capillary 13-1 may not be completely fixed by a mechanical force between components, an adhesive resistant to a high temperature (for example, a temperature of no less than 120° C.) may be coated on an outer wall of the capillary and an inner wall of the sleeve. The adhesive used may not react with a measured gas. FIG. 6 shows a schematic diagram of an assembled capillary laminar flow unit. An end face of a capillary bundle may be as flush as possible with an end face of the sleeve.

Further, in embodiments of the present disclosure, some control board cards may be installed inside the device for measuring a gas concentration. The control board card inside the device for measuring a gas concentration may convert a differential pressure signal into a concentration signal, and transmit the concentration signal to an upper computer control software in a form of a digital signal. A small display screen is installed on the housing to display a concentration value on the device for measuring a gas concentration. The control card board may also control an operation of the heating element according to a temperature value of the gas. In such embodiments, the device for measuring a gas concentration may have a stronger data processing and display capability. Using of a digital signal output may be more conducive to a signal transmission, and applicable to an application scenario of a distributed arrangement of the device for measuring a gas concentration.

Further, in embodiments of the present disclosure, the gas preheating module and the differential pressure conversion module may be manufactured into an integral portion by a fine machining, so as to replace discrete components, which may further reduce a volume of an equipment, reduce a fluctuation of the gas flowing, and reduce a difficulty of an assembly. For example, such embodiments disclose a structure of the gas preheating module and the differential pressure conversion module, and the structure is more compact and more accurate, and is more conducive to a comprehensive analysis of a measured result.

Figure 7:
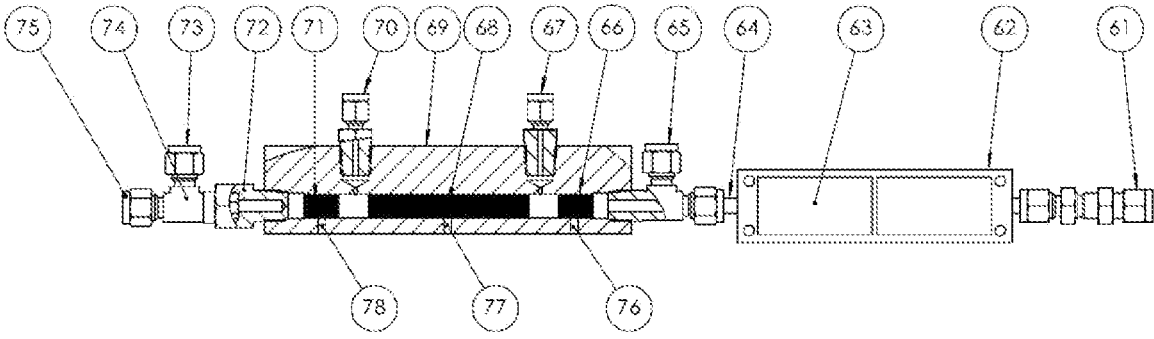
FIG. 7 shows a structural schematic diagram of a differential pressure conversion module and a preheating module according to another embodiment of the present disclosure.

According to embodiments of the present disclosure, as shown in FIG. 7, the gas preheating module includes a gas inlet straight joint 61, a gas preheating module gas pipeline 64, and a gas preheating module temperature measurement tee joint 65; a gas preheating module heating clamp block 62 is installed outside the gas preheating module gas pipeline 64 to heat a fluid in the gas pipeline. In order to improve a heating effect, the gas preheating module heating clamp block and an electric heating silicone pad installing groove 63 are machined on a surface of the gas preheating module heating clamp block.

The differential pressure conversion module includes a differential pressure conversion module housing 69, a micropore flow limiting element 72 and a differential pressure conversion module temperature measuring tee 74 which are sequentially connected through the ferrule and the thread; an upstream differential pressure measuring hole joint 67 and a downstream differential pressure measuring hole joint 70 are installed on an upper portion of the differential pressure conversion module housing 69 through the thread. An upstream capillary rectifying element 66, a capillary laminar flow unit 68 and a downstream capillary rectifying element 71 are installed in a gas flow channel in a middle portion of the differential pressure conversion module housing 69 in the gas flow direction. Projection positions of pressure measuring holes of the upstream differential pressure measuring hole joint 67 and the downstream differential pressure measuring hole joint 70 in the gas flow channel are located between 66 and 68 and between 68 and 71, respectively.

A function of the added upstream capillary rectifying element 66 is to perform flow conditioning on a gas flowing therethrough and reduce a fluctuation of a measured pressure at 67. When the gas flow flows through the micropore flow limiting element 72, a pressure fluctuation may occur at a pressure measuring hole at an upstream of the micropore flow limiting element 72 due to a sudden decreased size of an orifice plate with respect to a sectional area of an upstream gas flow channel. A function of the downstream capillary rectifying element 71 is to reduce the pressure fluctuation and thus improve a measurement accuracy.

In embodiments of the present disclosure, a length of the upstream capillary rectifying element 66 and the downstream capillary rectifying element 71 is 15 mm. Each of the upstream capillary rectifying element 66 and the downstream capillary rectifying element 71 is composed of 139 capillaries with an inner diameter of 0.4 mm, a wall thickness of 0.1 mm, and a length of 15 mm. A cannula with an outer diameter of 10 mm and a wall thickness of 1 mm is installed outside the capillary. A length of the cannula is also 15 mm. An end face of the cannula is flush with an end face of an internal capillary.

The capillary laminar flow unit 68 is composed of 139 capillaries with an inner diameter of 0.4 mm, a wall thickness of 0.1 mm and a length of 70 mm. Two cannulas with an outer diameter of 10 mm, a wall thickness of 1 mm and a length of 35 mm are installed outside the capillary laminar flow unit 68. A gap between the capillaries is sealed with an adhesive, and the capillaries are fixed in the cannula so that the capillaries may not move. A capillary effective flow area of the capillary laminar flow unit 68, the upstream capillary rectifying element 66 and the downstream capillary rectifying element 71 is 17.5 mm². The capillary effective flow area is close to a flow area (16.4 mm²) of a gas inlet pipeline at a front-end gas preheating module temperature measurement tee joint, which may be conducive to reducing a pressure fluctuation caused by a gas flowing.

In order to improve the measurement accuracy and an availability, an absolute pressure in the gas flow channel is measured at a position of the pressure measuring hole upstream of the differential pressure conversion module. In such embodiments, an absolute pressure gauge is provided at the upstream differential pressure measuring hole joint 67 to monitor an absolute pressure value in the gas flow channel. The absolute pressure value may be used to correct a relationship between a differential pressure and a concentration. A typical application scenario is that a pressure value at a measuring point may change during an aerial flight test of an extinguishing agent concentration in an aircraft engine compartment, which is different from an ambient pressure when a ground sensor is calibrated. At this time, the relationship between the differential pressure and the concentration may be corrected through the absolute pressure value in the flow channel.

Another function of the absolute pressure value is to determine and correct a validity of measured data. A typical application scenario is that when an extinguishing agent in a measured space suddenly sprays, a pressure at the measuring point may increase. In some cases, an increase of the pressure may be transmitted to the upstream differential pressure measuring hole joint 67, while a pressure at the downstream differential pressure measuring hole joint 70 has not increased, which may lead to an error. At this time, if the absolute pressure gauge detects an abrupt change or abnormal increase in pressure, it may be determined that a differential pressure value at this time is abnormal through an algorithm, and then the differential pressure value is corrected, for example, a difference of absolute pressure rise is subtracted in a differential pressure conversion.

Figure 8:
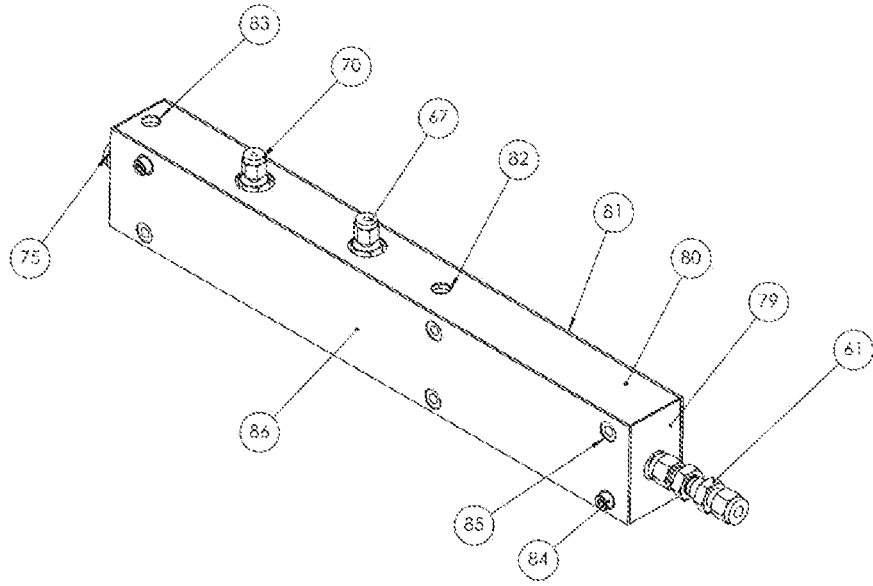
FIG. 8 shows a structural schematic diagram of a differential pressure conversion module and a preheating module after a thermal insulation housing is installed according to another embodiment of the present disclosure.

In embodiments of the present disclosure, as shown in FIG. 8, an assembly of a plurality of heat insulation panels is provided outside the structure of the gas preheating module and the differential pressure conversion module. The assembly of the heat insulation panels may effectively reduce a heat diffusion of an electric heating element, reduce an impact of an environment on a measurement, and protect the gas preheating module and the differential pressure conversion module from a damage caused by a mechanical force and a vibration.

Further, in embodiments of the present disclosure, a size of the device for measuring a gas concentration may be further reduced by means of micro-electromechanical. A device for measuring a differential pressure gas concentration is installed on a circuit board. The gas preheating module and the differential pressure conversion module having projected areas not exceeding an area of the circuit board, and are fixed on the circuit board and the housing. The circuit board is provided with a temperature measurement and temperature control circuit to realize a temperature control of a gas in the gas preheating module and the differential pressure conversion module. A volume size of the device for measuring a gas concentration may be controlled to be no more than a length of 10 cm, a height of 5 cm and a width of 4 cm. Such embodiments may be used in an application with a strict size requirement, such as a real-time monitoring of a certain gas concentration in the equipment.

Figure 9:
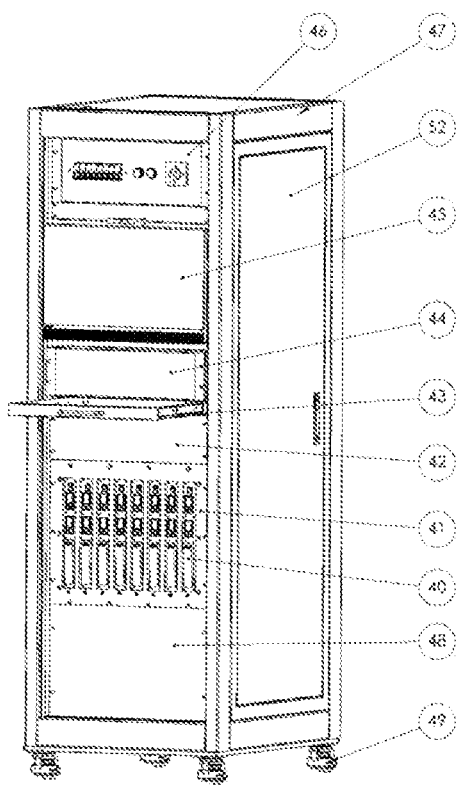
FIG. 9 shows a schematic diagram of an installation of a system of measuring a gas concentration in a cabinet according to an embodiment of the present disclosure.
Figure 10:
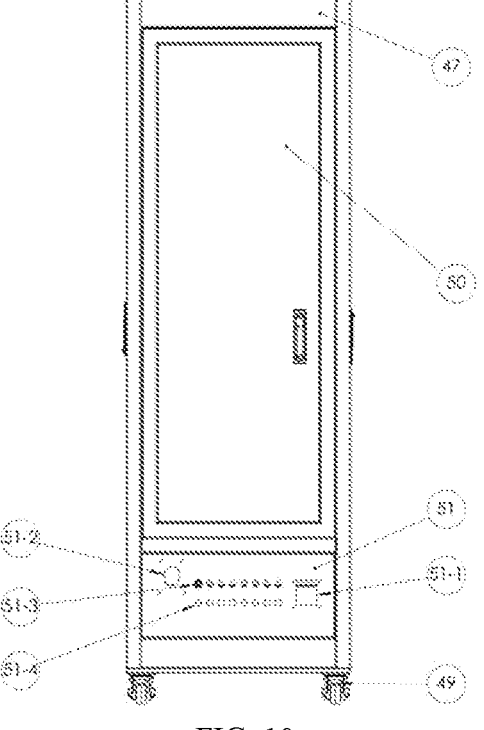
FIG. 10 shows a schematic diagram of a back interface of the cabinet shown in FIG. 9.

The present disclosure further provides a system of measuring a gas concentration. As shown in FIG. 9, FIG. 10 and FIG. 14, the system of measuring the gas concentration is composed of the device for measuring a gas concentration and a control device. The device for measuring a gas concentration is connected to the control device through a signal transmission line and an electrical line.

The system of measuring the gas concentration includes: at least one device for measuring a gas concentration used to convert the gas concentration into an electrical signal.

The control device is used for a communication and a power supply with the device for measuring a gas concentration and to convert the electrical signal generated by the device for measuring a gas concentration into a concentration value.

Figure 11:
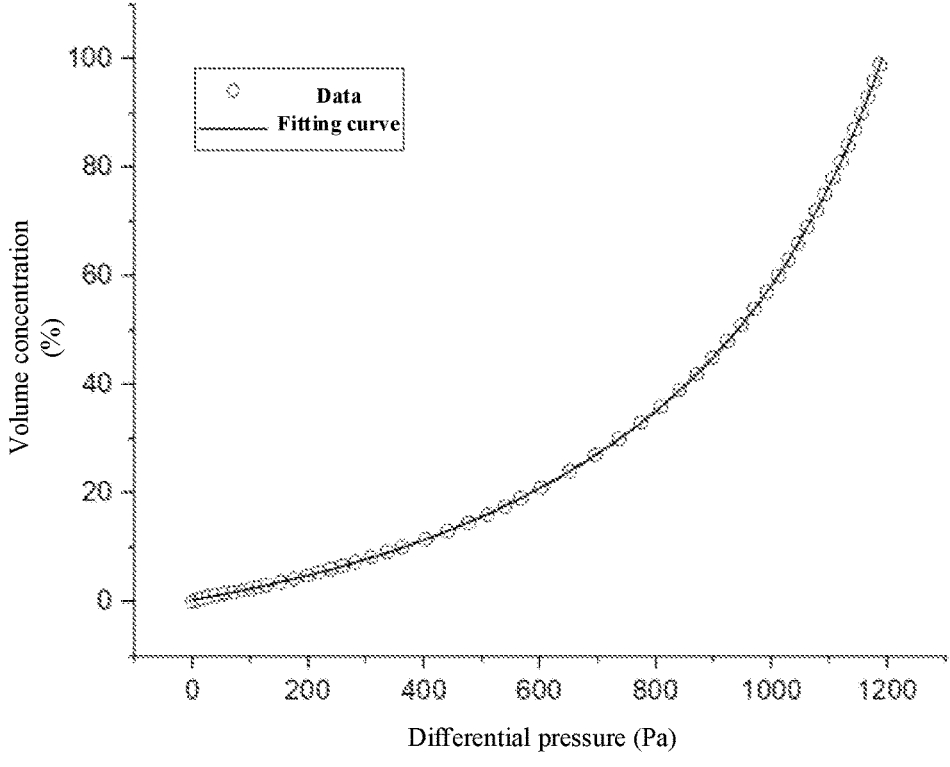
FIG. 11 shows a schematic diagram of an empirical relationship between a gas volume concentration and a differential pressure value according to an embodiment of the present disclosure.

According to embodiments of the present disclosure, as shown in FIG. 11, the control device may be operated, so that an empirical relationship between a gas volume concentration and a differential pressure value may be determined for the to-be-measured gas. The relationship between the gas volume concentration and the differential pressure value is described by a quadratic exponential decay curve.

The measuring device is connected to the control device through the electrical line. The measuring device transmits a measuring signal to the control device. The control device processes the measuring signal and converts the measuring signal into a concentration signal, and outputs the concentration signal through I/O equipment. The control device supplies power to the measuring device and controls a working state of the measuring device.

As shown in FIG. 9 and FIG. 10, eight devices 40 of measuring a gas concentration are installed in a cabinet through a fixing plug-in box 41 for the device for measuring a gas concentration. A fixed trench of the device 40 of measuring the gas concentration is reserved on the fixing plug-in box 41 for the device for measuring a gas concentration, and a gap between trenches is reserved for an air circulation. The gap may allow a ventilation gas flow to flow therethrough and prevent a heat emitted by the device 40 of measuring the gas concentration from interfering with other devices 40 of measuring a gas concentration.

A cooling and ventilating equipment plug-in box 42 is installed on the fixing plug-in box for the device for measuring a gas concentration. The cooling and ventilating equipment plug-in box 42 generates a gas flow blown into the fixing plug-in box 41 for the device for measuring a gas concentration to prevent a temperature interference generated between the devices 40 of measuring the gas concentration.

A keyboard/mouse tray 43 is installed on an upper portion of the cooling and ventilating equipment plug-in box 42. A control device plug-in box 44 is installed on an upper portion of the keyboard/mouse tray 43. The control device is installed inside the control device plug-in box 44.

A display 45 is installed on an upper portion of the control device plug-in box 44, and a power supply plug-in box 46 is installed on an upper portion of the display 45. The power supply plug-in box 46 is used to safely supply power to all powered equipments in the cabinet.

A cabinet reserved space 48 is located at a lower portion of the fixing plug-in box 41 for the device for measuring a gas concentration. In such embodiments, the cabinet reserved space 48 may be used to install another fixing plug-in box 41 for the device for measuring a gas concentration, and expand a number of the devices of measuring the gas concentration to 16. In some applications, the cabinet reserved space 48 is used to install a printer and a maintenance tool kit, so as to improve a usability of the system.

Two side access doors 52 are provided on two sides of a cabinet 47, a rear access door 50 is provided on a rear portion of the cabinet 47, and an interface panel 51 is installed below the rear access door 50. The interface panel 51 is provided with a power output installing hole 51-1 and a power input connector installing hole 51-2, eight cabinet gas inlet bulkhead joints 51-3, and eight cabinet gas outlet bulkhead joints 51-4. The joints are connected to the gas inlet straight joint 4 and the gas outlet panel installing straight joint 30 on the device for measuring a gas concentration through pipes, respectively. The connection solution may effectively reduce a complexity of a system connection in a test and avoid a damage to the device for measuring a gas concentration. In some applications, if a pollutant, such as dust, etc., that may enter a gas pipeline may exist in a test space, a filter may be installed on the gas pipeline between the interface panel 51 and the gas inlet straight joint 4 to prevent the pollutant from entering the device for measuring a gas concentration to cause a blockage.

Figure 12:
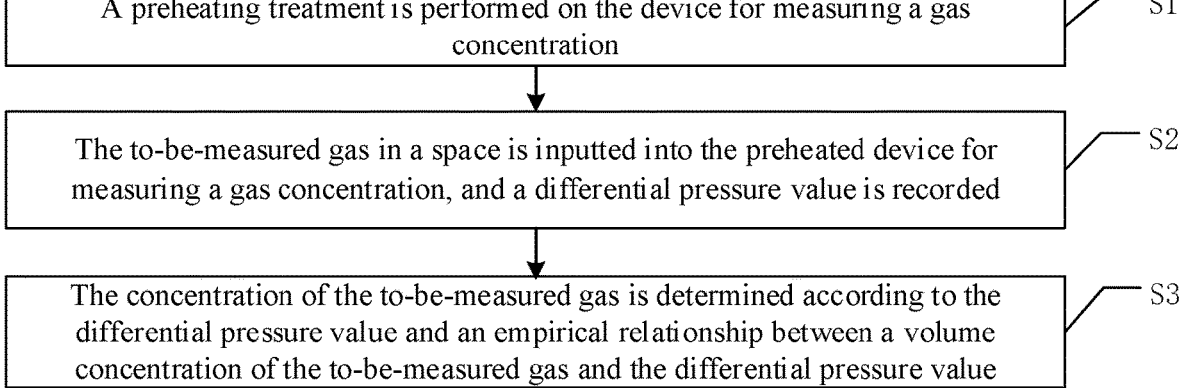
FIG. 12 shows a flow schematic diagram of a method for measuring a gas concentration according to an embodiment of the present disclosure.

The present disclosure further provides a method for measuring a gas concentration, as shown in FIG. 12. The method for measuring a gas concentration includes operations S1 to S3.

In operation S1, a preheating treatment is performed on the device for measuring a gas concentration.

In operation S2, the to-be-measured gas in a space is inputted into the preheated device for measuring a gas concentration, and a differential pressure value is recorded.

In operation S3, the concentration of the to-be-measured gas is determined according to the differential pressure value and an empirical relationship between a volume concentration of the to-be-measured gas and the differential pressure value.

According to embodiments of the present disclosure, the operation S1 includes: operations S11 to S12.

In operation S11, a to-be-measured gas with a concentration of 0 or a known concentration is injected into the device for measuring a gas concentration.

In operation S12, a heating is performed through a preheating module electric heating unit and a differential pressure conversion module electric heating unit, so that temperature values measured by a preheating module thermocouple and a differential pressure conversion module thermocouple are stable and the same, so as to complete the preheating treatment.

According to embodiments of the present disclosure, more specifically, as shown in FIG. 13, the method for measuring a gas concentration may include steps 101 to 106.

In step 101, a test point in a test space is connected to a device for measuring a gas concentration by using a gas pipeline.

In step 102, whether a status of a gas flowing through the device for measuring a gas concentration is normal is checked.

In step 103, the device for measuring a gas concentration is preheated to a set temperature, and an output signal of the measuring device is checked.

In step 104, the device for measuring a gas concentration is calibrated by using a target gas with a known concentration.

In step 105, a test is carried out and data is recorded.

In step 106, after the test is completed, the device for measuring a gas concentration is cooled and a residual gas in the measuring device is purged.

In the step 101, the gas pipeline is connected and checked. According to a test-site condition, the test site in the test space is connected to a gas inlet joint of a corresponding device for measuring a gas concentration on the cabinet by using a gas pipeline with the same length and specification, and whether the gas inlet joint of the corresponding device for measuring a gas concentration on the cabinet is correctly connected to the gas inlet straight joint 4 of the device for measuring a gas concentration is checked. A gas outlet joint of a gas cabinet on the cabinet is connected to a vacuum pump by using the gas pipeline with the same length and specification, and whether the gas outlet joint of the corresponding device for measuring a gas concentration on the cabinet is correctly connected to the gas outlet panel installing straight joint 30 of the device for measuring a gas concentration is checked.

In the step 102, the gas flowing status is checked. A vacuum pump is turned on, and whether the gas flowing status in each device for measuring a gas concentration is normal and whether a gas leakage and a blockage occur are checked through a vacuum gauge on the vacuum pump and the flowmeter 26 on the device for measuring a gas concentration. A maintenance may be performed if any problem occurs. The process may proceed to the next step after confirming that no problem occurs.

In the step 103, the device for measuring a gas concentration is preheated, and the output signal of the device for measuring a gas concentration is checked. When the gas flows normally from the device for measuring a gas concentration, the control device is turned on, the output signal of the device for measuring a gas concentration is collected, and a heating of each device for measuring a gas concentration is started. At this time, the gas entering the device for measuring a gas concentration should be a to-be-measured target gas with a concentration of 0 or a known concentration. When temperature values measured by the gas preheating module thermocouple and the differential pressure conversion module thermocouple of each device for measuring a gas concentration are stable and the same, the preheating of the device for measuring a gas concentration is completed. At this time, whether the output signal of the device for measuring a gas concentration collected by the control device is stable is checked. The process may proceed to the next step when the signal of the device for measuring a gas concentration is stable.

In the step 104, a relationship between a differential pressure and a concentration of the device for measuring a gas concentration is calibrated. A target gas with a known concentration is placed at the test point in the test space, and the gas may be inhaled into the gas pipeline and then flow into the device for measuring a gas concentration. The target gas with the known concentrations may be stored in a gas sampling bag or storage tank. It should be noted that an environmental condition in which the target gas with the known concentration enters the gas pipeline should be similar to a test environment as much as possible, or an impact of different test environments should be avoided through a reasonable design, which may improve a calibration accuracy. When the target gas with the known concentration flows through the device for measuring a gas concentration, the output signal of the device for measuring a gas concentration may change, and a change value may be recorded. The process is repeated to acquire corresponding data points between a signal of the device for measuring a gas concentration and a gas concentration. The data points are fit by using an empirical model, so as to acquire a corresponding relationship between the signal of the device for measuring a gas concentration and the gas concentration. In many cases, only a few points, instead of all points, need to be calibrated every time, and the corresponding relationship may be acquired through a known empirical model fitting. When environmental conditions, such as a temperature and a humidity of a laboratory, are similar to test conditions, an existing corresponding relationship may also be used, that is, the step may be skipped.

Step 105, the test is carried out. After a test preparation is completed in the test space, the test is started, and the control device records a curve of target gas concentrations at a plurality of measuring points varying with time.

In step 106, the test is completed and the system is turned off. After the test is completed, test data is saved and the heating of the device for measuring a gas concentration is turned off. At this time, a gas is continuously injected into the device for measuring a gas concentration to cool heated elements in the device for measuring a gas concentration. When the temperature values measured by the gas preheating module thermocouple and the differential pressure conversion module thermocouple of the device for measuring a gas concentration decreases to an acceptable level, the vacuum pump is turned off. If the target gas is toxic or corrosive, it is required to ensure that the target gas in the device for measuring a gas concentration and the gas pipeline has been cleaned by air before the vacuum pump is turned off. Finally, the control device is turned off. If the test is not carried out for a long time, the gas inlet on the cabinet should be blocked after the system is turned off, so as to prevent an entry of the pollutant, such as dust, etc.

The present disclosure provides a device and method for measuring a gas concentration, which have a high measurement accuracy, may be calibrated, have a good repeatability, may adapt to a change in a test environmental factor, may be used to analyze whether the gas concentration meets a demand, and have a broad application prospect.

Compared with a traditional device and method for measuring a gas concentration, the device and method for measuring a gas concentration in the present disclosure have a fast response speed, a high measurement accuracy, a good long-term stability, and a convenient use and maintenance, and may be used for both a rapid measurement of the gas concentration and a long-term monitoring of the gas concentration.

Those skilled in the art may clearly understand that, for the convenience and brevity of the description, only a division of the above-mentioned functional modules is taken as an example for description. In a practical application, the above-mentioned functions are assigned to be completed by different functional modules as required, that is, an internal structure of the device is divided into different functional modules to complete all or part of the above-mentioned described functions. A specific working process of the above-mentioned device will not be repeated here, please refer to the corresponding process in the above-mentioned method embodiments.

Finally, it should be noted that: the above-mentioned embodiments are only used to illustrate the technical solution of the present disclosure, and are not intended to limit the technical solution of the present disclosure. Although the present disclosure has been described in detail with reference to the above-mentioned embodiments, those skilled in the art should understand that: they may still make modifications to the technical solution recited in the above-mentioned embodiments, or make equivalent substitutions to some or all of the technical features. In a case of no conflict, features in embodiments of the present disclosure may be arbitrarily combined. These modifications or substitutions do not make the essence of corresponding technical solutions depart from the scope of the technical solution of embodiments of the present disclosure.

What is claimed is:

1. A device for measuring a gas concentration, comprising:

a preheating module configured to preheat and perform flow conditioning on an input to-be-measured gas to output a first stage gas;

a differential pressure conversion module connected to the preheating module, wherein the differential pressure conversion module is configured to allow the first stage gas flowing through the differential pressure conversion module to generate a differential pressure change value; and a processing module configured to acquire a volume concentration of the to-be-measured gas according to the differential pressure change value;

wherein the differential pressure conversion module comprises a capillary laminar flow unit having a plurality of capillaries, and flow channels of the plurality of capillaries become a main channel of a gas flow, so as to form a laminar flow structure.

2. The device according to claim 1, wherein the preheating module comprises:

a gas flow channel configured to perform flow conditioning on the to-be-measured gas;

a preheating module electric heating unit configured to heat the gas flow channel to conduct and heat the to-be-measured gas; and a preheating module temperature control unit configured to measure and regulate a temperature of the to-be-measured gas, and wherein the gas flow channel is not bent and is provided with a plurality of capillary pipelines.

3. The device according to claim 2, wherein the preheating module temperature control unit comprises a preheating module thermocouple arranged perpendicular to a gas flow direction.

4. The device according to claim 1, wherein the differential pressure conversion module further comprises:

a differential pressure conversion module housing, wherein the capillary laminar flow unit is installed inside the differential pressure conversion module housing, an upstream differential pressure measuring hole is arranged at the differential pressure conversion module housing corresponding to an upstream end of the capillary laminar flow unit, and a downstream differential pressure measuring hole is arranged at the differential pressure conversion module housing corresponding to a downstream end of the capillary laminar flow unit;

a differential pressure sensor having two ends, wherein one of the two ends is connected to the upstream differential pressure measuring hole, the other one of the two ends is connected to the downstream differential pressure measuring hole, and the differential pressure sensor is configured to measure a differential pressure between the differential pressure measuring holes; and a flow limiting element located at a downstream outlet of the differential pressure conversion module housing, wherein the flow limiting element is configured to maintain a constant volume flow flowing through the device for measuring a gas concentration.

5. The device according to claim 4, wherein the differential pressure conversion module further comprises:

a differential pressure conversion module electric heating unit configured to heat the differential pressure conversion module; and a differential pressure conversion module temperature control unit configured to measure and regulate a temperature of the to-be-measured gas flowing through the capillary laminar flow unit and the flow limiting element, wherein the differential pressure conversion module temperature control unit comprises a differential pressure conversion module thermocouple arranged perpendicular to a gas flow direction.

6. The device according to claim 4, wherein the differential pressure conversion module further comprises:

an upstream capillary rectifying element located between an upstream inlet of the differential pressure conversion module housing and the upstream differential pressure measuring hole;

a downstream capillary rectifying element located between the downstream outlet of the differential pressure conversion module housing and the downstream differential pressure measuring hole; and an absolute pressure gauge arranged at the upstream differential pressure measuring hole, wherein the absolute pressure gauge is configured to monitor an absolute pressure value in a gas flow channel.

7. The device according to claim 1, wherein the capillary laminar flow unit further comprises:

a sleeve comprising a first sleeve and a second sleeve, wherein the first sleeve and the second sleeve are sleeved outside the plurality of capillaries from two sides, respectively; and an adhesive coated on outer walls of the plurality of capillaries and an inner wall of the sleeve, wherein the adhesive is configured to fix the plurality of capillaries, so that the plurality of capillaries are not moved under an action of a gas flow of the to-be-measured gas.

8. The device according to claim 1, wherein a pipe diameter $d_{LFE}$ of each of the plurality of capillaries is determined by:

$$d_{LFE} = \frac{4\rho Q_V}{\pi \mu n Re}$$

where $\mu$ is a dynamic viscosity of the to-be-measured gas, n is the number of the capillaries, $\rho$ is a density of the to-be-measured gas, Re is a Reynolds number, and $Q_v$ is a volume flow rate of the to-be-measured gas.

9. A method for measuring a gas concentration, using the device for measuring the gas concentration according to claim 1 to measure a concentration of the to-be-measured gas, the method comprising:

operation S1: performing a preheating treatment on the device for measuring the gas concentration;

operation S2: inputting the to-be-measured gas in a space into the preheated device for measuring the gas concentration, and recording a differential pressure value; and operation S3: determining the concentration of the to-be-measured gas according to the differential pressure value and an empirical relationship between the volume concentration of the to-be-measured gas and the differential pressure value.

10. The method according to claim 9, wherein the operation S1 comprises:

operation S11: injecting the to-be-measured gas with a concentration of 0 or a known concentration into the device for measuring the gas concentration; and operation S12: performing a heating through a preheating module electric heating unit and a differential pressure conversion module electric heating unit, so that temperature values measured by a preheating module thermocouple and a differential pressure conversion module thermocouple are the same, so as to complete the preheating treatment.

* * * * *